(12) United States Patent
Hoffman et al.

(10) Patent No.: US 8,484,050 B2
(45) Date of Patent: Jul. 9, 2013

(54) SYSTEM AND METHOD FOR EVALUATING UNDERWRITING REQUIREMENTS

(75) Inventors: Nancy J. Hoffman, Churubusco, IN (US); Brian N. Ivanovic, Fort Wayne, IN (US); C. Allen Pinkham, IV, Fort Wayne, IN (US); Diana M. Stabler, Fort Wayne, IN (US); Edward J. Wright, Fort Wayne, IN (US)

(73) Assignee: Swiss Reinsurance Company Ltd., Zürich (CH)

( * ) Notice: Subject to any disclaimer, the term of this patent is extended or adjusted under 35 U.S.C. 154(b) by 2076 days.

(21) Appl. No.: 10/981,852

(22) Filed: Nov. 5, 2004

(65) Prior Publication Data

US 2005/0131742 A1 Jun. 16, 2005

Related U.S. Application Data

(60) Provisional application No. 60/517,957, filed on Nov. 6, 2003.

(51) Int. Cl.
*G06Q 40/00* (2012.01)
(52) U.S. Cl.
USPC .............................................. 705/4
(58) Field of Classification Search
USPC ...................... 705/2–4, 26, 34, 10
See application file for complete search history.

(56) References Cited

U.S. PATENT DOCUMENTS

| | | | |
|---|---|---|---|
| 4,975,840 A | 12/1990 | DeTore et al. | |
| 5,523,942 A | 6/1996 | Tyler et al. | |
| 5,655,085 A | 8/1997 | Ryan et al. | |
| 6,931,378 B2 * | 8/2005 | Rao et al. | 705/26 |
| 2003/0236685 A1* | 12/2003 | Buckner et al. | 705/4 |
| 2004/0044600 A1* | 3/2004 | Chu et al. | 705/34 |
| 2005/0027645 A1* | 2/2005 | Lui et al. | 705/38 |
| 2009/0012840 A1* | 1/2009 | Gaubatz et al. | 705/10 |

OTHER PUBLICATIONS

Wilkinson, Barry A. What Lies Beneath. Best's Review. Oldwick: Aug. 2001, vol. 102, p. 109.*
Barzilai, David A. and Singer, Mendel E. The potential Impact on Melanoma Mortality of Reducing Rates of Suboptimal Excision Margins. The Journal of Investigative Dermatology. London: Jun. 2003, vol. 120, p. 1067.*

* cited by examiner

*Primary Examiner* — Valerie Lubin
(74) *Attorney, Agent, or Firm* — Oblon, Spivak, McClelland, Maier & Neustadt, L.L.P.

(57) ABSTRACT

A computer system and method for evaluating underwriting requirements, and for evaluating expected changes in mortality of an insurable class in response to changes in such requirements. In certain embodiments, the method and system involves storing data relating to the requirements, determining expected mortality using a first set of requirements, changing one or more of the requirements and predetermining expected mortality using the changed set of requirements and the stored data. In addition to evaluating proposed changes in underwriting requirements, the system and method may be used in the design and pricing of insurance products.

36 Claims, 6 Drawing Sheets

SYSTEM AND METHOD FOR EVALUATING UNDERWRITING REQUIREMENTS

RELATED APPLICATIONS

The present application is related to and claims priority to U.S. Provisional Patent Application Ser. No. 60/517,957, filed on Nov. 6, 2003, entitled SYSTEM AND METHOD FOR EVALUATING UNDER WRITING REQUIREMENTS. The subject matter disclosed in that provisional application is hereby expressly incorporated into the present application.

FIELD OF THE INVENTION

The present invention relates generally to insurance and, more particularly to systems and methods of evaluating underwriting requirements used in connection with insurance products. In certain embodiments, the invention relates to systems and methods of quantifying the unique and shared value relationships existing between a plurality of underwriting requirements, and evaluating the impact(s) of changing one or more of the requirements.

BACKGROUND AND SUMMARY

Life insurers are increasingly challenged to reduce underwriting expenses and increase underwriting speed and decision making, while maintaining superior mortality protection and promoting fairness in risk selection. Faced with these mounting pressures, some insurers modify underwriting procedures and practices without fully understanding the potential long term impacts of changes. For some insurers, concerns regarding immediate underwriting costs and simplification of underwriting procedures are paramount. Future mortality costs receive less emphasis since those costs are often difficult to predict with precision, and may be mitigated through reinsurance arrangements, inflation, and other factors.

Increased administrative costs resulting from enhanced privacy and security concerns also affect insurers' choices of underwriting requirements. These measures also influence administrative work flow and the manner of dealing with insurance consumers.

Insurers can evaluate the impacts of changes in underwriting procedures and requirements for existing or proposed insurance products by conducting extensive studies and analyses of relevant published data and of their own empirical data. However, such studies are time consuming and laborious. There exists a need for an automated, technologically-based approach to evaluating existing underwriting requirements, and for quickly and cost effectively evaluating the impacts attendant to changes in such requirements.

One embodiment of the present invention provides a computer method for evaluating expected changes in mortality of an insurable class in response to a change in underwriting requirements. The method comprise the steps of storing data relating to protective values of a plurality of underwriting requirements; determining an expected mortality for the insurable class using a first set of underwriting requirements; changing one or more of the underwriting requirements of the first set of underwriting requirements; and redetermining the expected mortality for the insurable class using the changed set of underwriting requirements and the stored data relating to protective values. The embodiment may further comprise the step of conducting a protective value study to identify the data relating to protective values of the plurality of underwriting requirements. This and other embodiments may also further include the steps of determining prevalence of one or more impairments in a population, and/or identifying one or more impairments uncovered by at least one of the plurality of underwriting requirements. In the latter case, the method may further comprise the step of determining one or more causes of death eliminated by screening for impairments uncovered by the underwriting requirements.

Certain embodiments may further include the steps of determining total causes of death eliminated by at least one of the plurality of underwriting requirements, and comparing the expected causes of death for the insurable class with causes of death for the general population. These or other embodiments may further comprise the step of calculating mortality savings for at least one of the underwriting requirements. The mortality savings calculated may be stored by age, gender and smoking status. The step of calculating mortality savings may further comprise the step of calculating unique mortality savings, shared mortality savings and total mortality savings for the underwriting requirements.

Another embodiment of the invention comprises a computerized system for evaluating expected changes in mortality of an insurable class in response to a change in underwriting requirements. The subject system may comprise existing computer hardware programmed to perform the steps set forth above in connection with the embodiments of the aforementioned method.

Another embodiment of the invention comprises a computer method of designing a life insurance product. This method comprises the steps of storing data relating to protective values of a plurality of underwriting requirements; calculating a unique mortality savings, a shared mortality savings and/or total mortality savings for at least one of the underwriting requirements; determining an expected mortality for an insurable class using a first set of underwriting requirements; changing one or more of the underwriting requirements of the first step; redetermining the expected mortality for the insurable class using the changed set of requirements; and, using at least one of the determined expected mortality and the redetermined expected mortality, designing a life insurance product. This method may operate iteratively to consider a plurality of sets of underwriting requirements in designing the product. The method may be operated so as to achieve a predetermined mortality rate for the insurable class, or to achieve some other targeted objective. The method may further comprise the steps of conducting a protective value study to identify data relating to protective values of the underwriting requirements, and/or storing either unique, shared or total mortality savings for the underwriting requirements by age, gender and smoking status.

One embodiment of the subject method may further comprise the steps of determining prevalence of one or more impairments in a population, and identifying one or more impairments uncovered by at least one of the underwriting requirements. This or other embodiments may further comprise the steps of determining one or more causes of death eliminated by screening for one or more impairments uncovered by the underwriting requirements, and determining total causes of death eliminated by a first set of underwriting requirements and a changed set of underwriting requirements. Expected causes of death for the insurable class may further be compared with causes of death for a general population.

Yet another embodiment of the subject invention comprises an automated system for designing a life insurance product. The automated system comprises known computer hardware programmed to accomplish the steps of the aforementioned methods.

Additional features and advantages of the system and method will become apparent to those skilled in the art upon consideration of the following detailed description of an illustrative embodiment which exemplifies the best mode of carrying out the system and method, as presently conceived.

BRIEF DESCRIPTION OF THE DRAWINGS

The present disclosure will be described hereafter with reference to the attached drawings which are given as non-limiting examples only, in which.

The exemplifications set out herein illustrate embodiments of the system and method, and such exemplifications are not intended to be construed as limiting the scope of the invention in any manner.

DETAILED DESCRIPTION OF THE DRAWINGS

Figure 1:
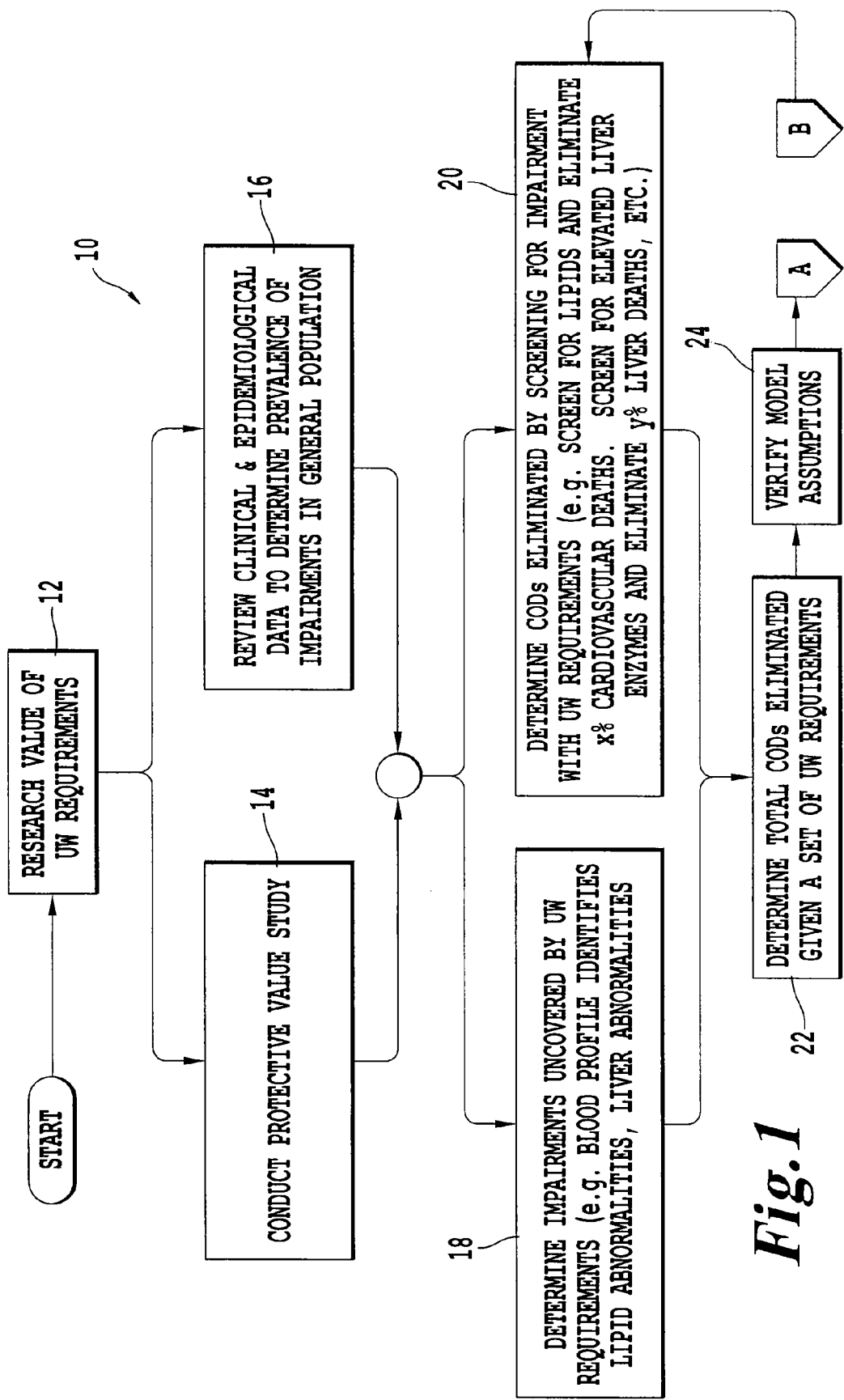
FIG. 1 is a flow chart illustrating an embodiment of a method and system for evaluating underwriting requirements.

FIG. 1 is a portion of a flow chart 10 which illustrates one embodiment of a method and system for evaluating underwriting requirements. The flow chart of FIG. 1 describes a portion of the embodiment which may be characterized as a "research" phase. The first step 12 is this embodiment is conducting research relating to the values of a plurality of underwriting requirements. Underwriting requirements are factors considered by an insurer in designing and/or pricing an insurance product. Consideration of underwriting requirements allows an insurer to make judgments regarding the likelihood of occurrence of an insurable event. In the case of life insurance, examples of underwriting requirements include:

1. data collected on an insurance application;
2. information collected in a medical examination;
3. blood profiles;
4. urinalysis;
5. electrocardiograms;
6. attending physicians' statements;
7. prescription profiles;
8. motor vehicle reports; and
9. information from a Medical Information Bureau;

An insurer may not use all of the requirement examples listed above in connection with a particular insurance product. Other requirements may also be used in combination with, or in place of the examples listed. Important considerations in the selection of requirements used are the costs associated with implementing the requirement (whether those costs are born by the insurer or the applicant), the speed with which requirements can be implemented, the useful information provided by the requirement (i.e., impairments identified by implementing the requirement), whether a requirement is uniquely suited to identify useful information, and other considerations.

One tool for determining the value of underwriting requirements is known as a protective value study. The step of conducting a protection value study is illustrated in the illustrative embodiment of FIG. 1 by step 14. Protective value may be defined as the present value of anticipated excess mortality costs attributable to a risk uncovered by a particular underwriting requirement. A protection value study is a review of existing insurance policies and the underwriting requirements which underlie those policies. The results include a measure of an individual requirement's effectiveness in terms of mortality savings per dollar of policy face amounts. Results may also be expressed as the present value of future death benefits per dollar amount of insurance-in-force saved by eliminating the anticipated excess mortality cost attributable to the risk uncovered by a requirement. Protective value studies that quantify mortality savings require relatively large volumes of data to produce the most desirable results. In general, several thousand cases are needed to draw significant conclusions. However, valuable but less precise information regarding a requirement's protective value may be obtained through smaller studies.

There are two basic approaches which may be used in conducting a protective value study. The first approach is a "univariate" method which considers a single requirement at a time. The alternative is a "multivariate" approach where multiple requirements and their interactions are evaluated simultaneously. Although there are advantages and disadvantages to each approach, the multivariate approach is generally preferred in the context of the illustrated embodiments.

There may be certain requirements about which useful information may not be uncovered by a protective value study. The gathering of information regarding such requirements is illustrated in FIG. 1 by step 16. In this step, clinical and epidemiological data are reviewed to determine the prevalence of impairments in the general population. Underwriting requirements which uncover such impairments are identified. Care is taken so as to not "double count" regarding the value of individual requirements, and to correlate the data uncovered in the clinical and epidemiological review with the protective value study results.

In the embodiment of flow chart 10, step 18 represents a determination of impairments uncovered by underwriting requirements. For example, the "blood profile" requirement can be used to uncover lipid abnormalities and/or liver abnormalities. A related step 20 illustrates determining causes of deaths eliminated by screening for a particular impairment with a particular underwriting requirement. For example, use of a blood profile to screen lipid abnormalities will eliminate a certain percentages of deaths from cardiovascular disease. Similarly, screening for certain liver enzymes will eliminate a certain percentage of deaths from liver disease. In the illustrated embodiment, the results of steps 18 and 20 are combined in step 22 in which a determination of total causes of deaths eliminated is given for sets of underwriting requirements. The sets of underwriting requirements for which such a determination is made can include all possible combinations of requirements considered by the system, or only those particular sets of requirements being evaluated by the method and system which are commonly, or likely to be used by insurers.

Following step 22, the illustrative embodiment verifies the assumptions used in a step illustrated by block 24. The particular manner of verification is discussed in additional detail in connection with FIG. 2.

Figure 2:
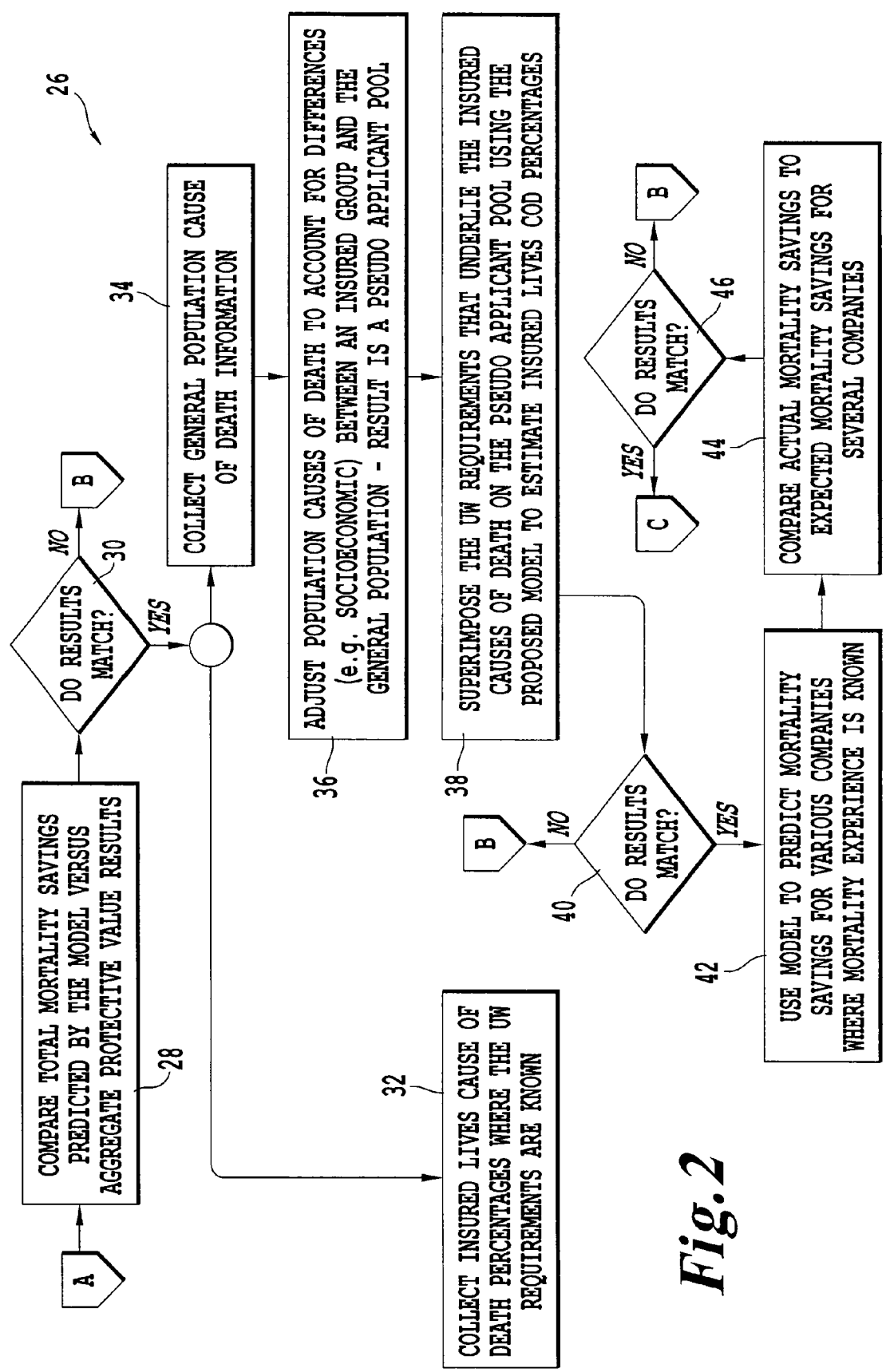
FIG. 2 is a continuation of the flow chart of FIG. 1.

FIG. 2 illustrates an additional flow chart portion 26 illustrating an embodiment of a method and system for evaluating underwriting requirements. The flow chart of FIG. 2 describes a portion of the embodiment which may be characterized as a "validation" or "verification" phase. Step 28 in the flow chart of FIG. 2 is a comparison of total mortality savings predicted by the steps discussed in connection with FIG. 1 to the protective value results.

If the results do not match (step 30), the method and system branches back to step 20 of FIG. 1 for a redetermination of causes of deaths eliminated by screening for a particular impairment. If the results do match, the process proceeds as illustrated in FIG. 2. In step 32, insured lives cause of death percentages are collected for a known set of underwriting requirements. This information is not generally publicly available, but may be collected from an insurer's files based on prior experience, or from comparable sources. In step 34 of FIG. 2, information is collected regarding causes of death in the general population. In step 36, adjustments are made to the information collected in step 34 to account for differences between an insured group and the general population. The result is generation of a "pseudo" applicant pool in the pre-underwriting stage. In step 38, the known underwriting requirements that underlie the insured lives cause of death percentages are superimposed on the pseudo insurance applicant pool to create a predicted cause of death distribution for the known requirements. These results are then compared in decision step 40 with the results of step 32. If the results do not match, the process branches back to step 20 of FIG. 1 and continues in an iterative manner. If the results of step 40 do match, the model is used to predict expected mortality savings in instances where mortality experience is known. This operation is illustrated in step 42. In step 44, actual mortality savings achieved in known situations are compared to the expected mortality savings predicted by the model. If the results do not match (step 46), the process again branches back to step 20 of FIG. 1 and the process proceeds iteratively. If the results of the comparison of step 44 match, the process proceeds as illustrated in FIG. 3.

Figure 3:
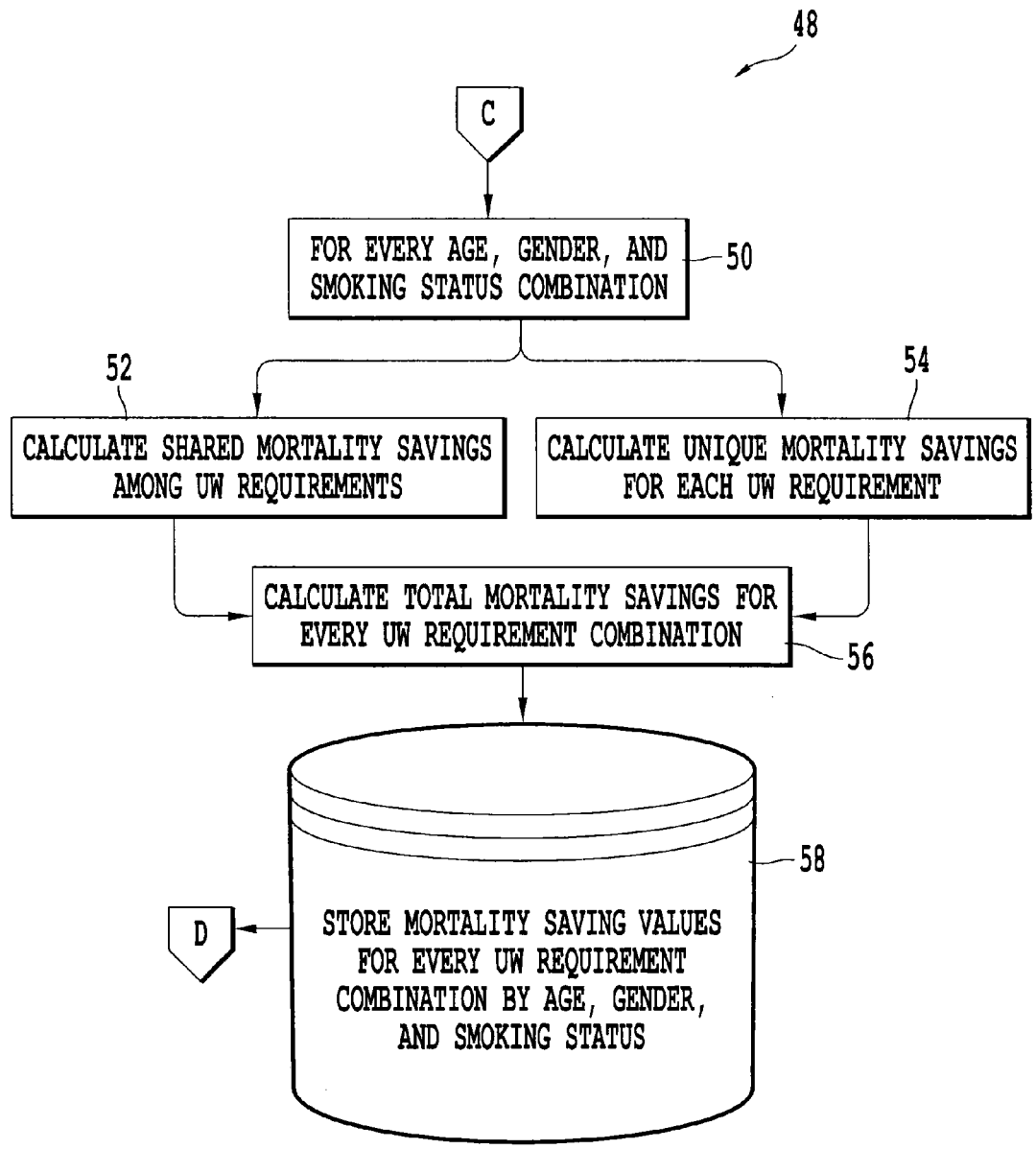
FIG. 3 is a continuation of the flow chart of FIG. 2.
Figure 5:
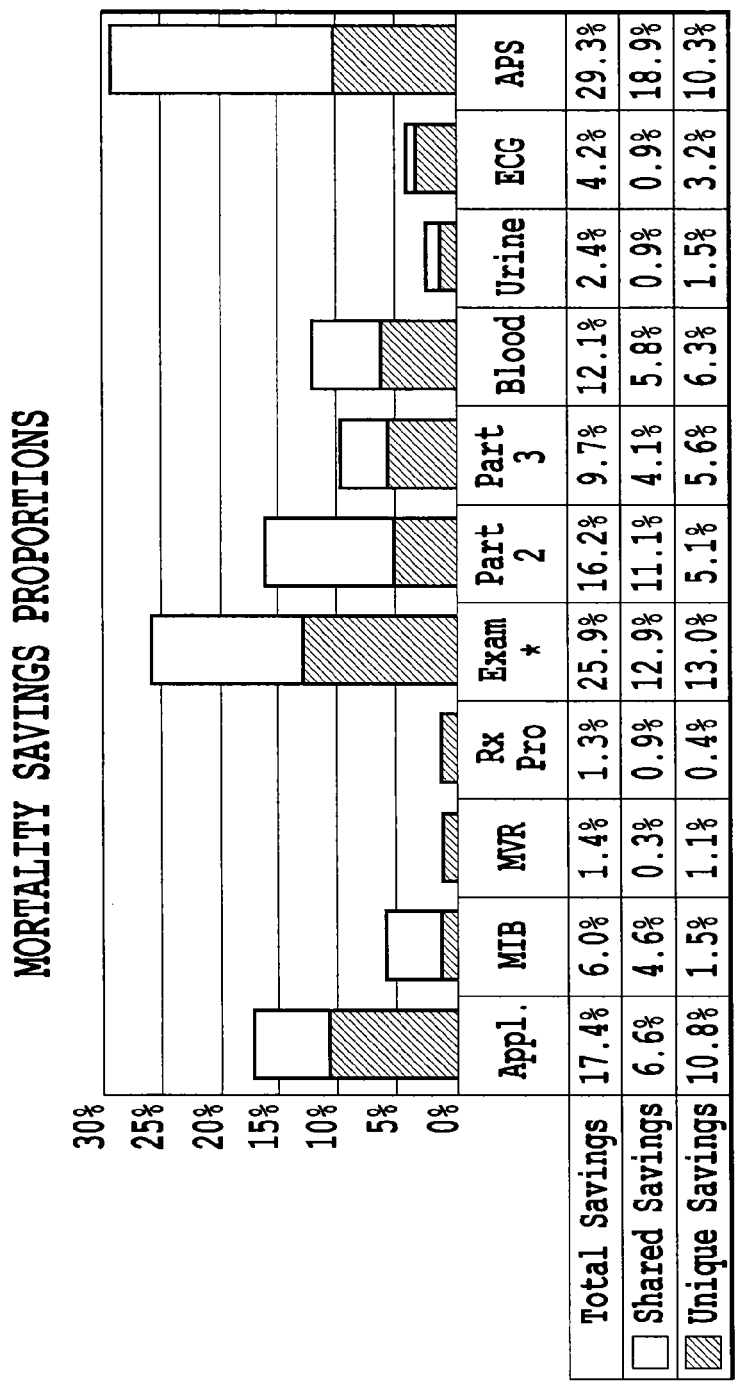
FIG. 5 is a graphical representation of shared, unique and total mortality savings as determined from a protective value study for a plurality of underwriting requirements.

FIG. 3 is a portion 48 of a flow chart further illustrating an embodiment of a method and system for evaluating underwriting requirements. The flow chart of FIG. 3 illustrates the manner in which the process continues after the results of the comparisons of step 44 are found to agree. In certain embodiments, the results are compiled in combinations which consider age, gender and smoking status. This feature is illustrated in the flow chart of FIG. 3 by step 50. Step 52 illustrates the calculation of shared mortality savings for the underwriting requirements. Similarly, step 54 illustrates the calculation of unique mortality savings for each underwriting requirement. Calculation of both unique and shared mortality savings help to identify how much duplication occurs between underwriting requirements. FIG. 5, discussed below, graphically illustrates example values for particular underwriting requirements.

In step 56, total mortality savings are calculated for a plurality of combinations of individual underwriting requirements. In the illustrated embodiment, such calculation is made for every possible underwriting requirement under consideration. Other embodiments may ignore certain combinations which are unlikely to occur. Following calculation of total mortality savings in step 56, the results are stored in the operation represented by step 58 for the requirement combinations by age, gender and smoking status.

Figure 4:
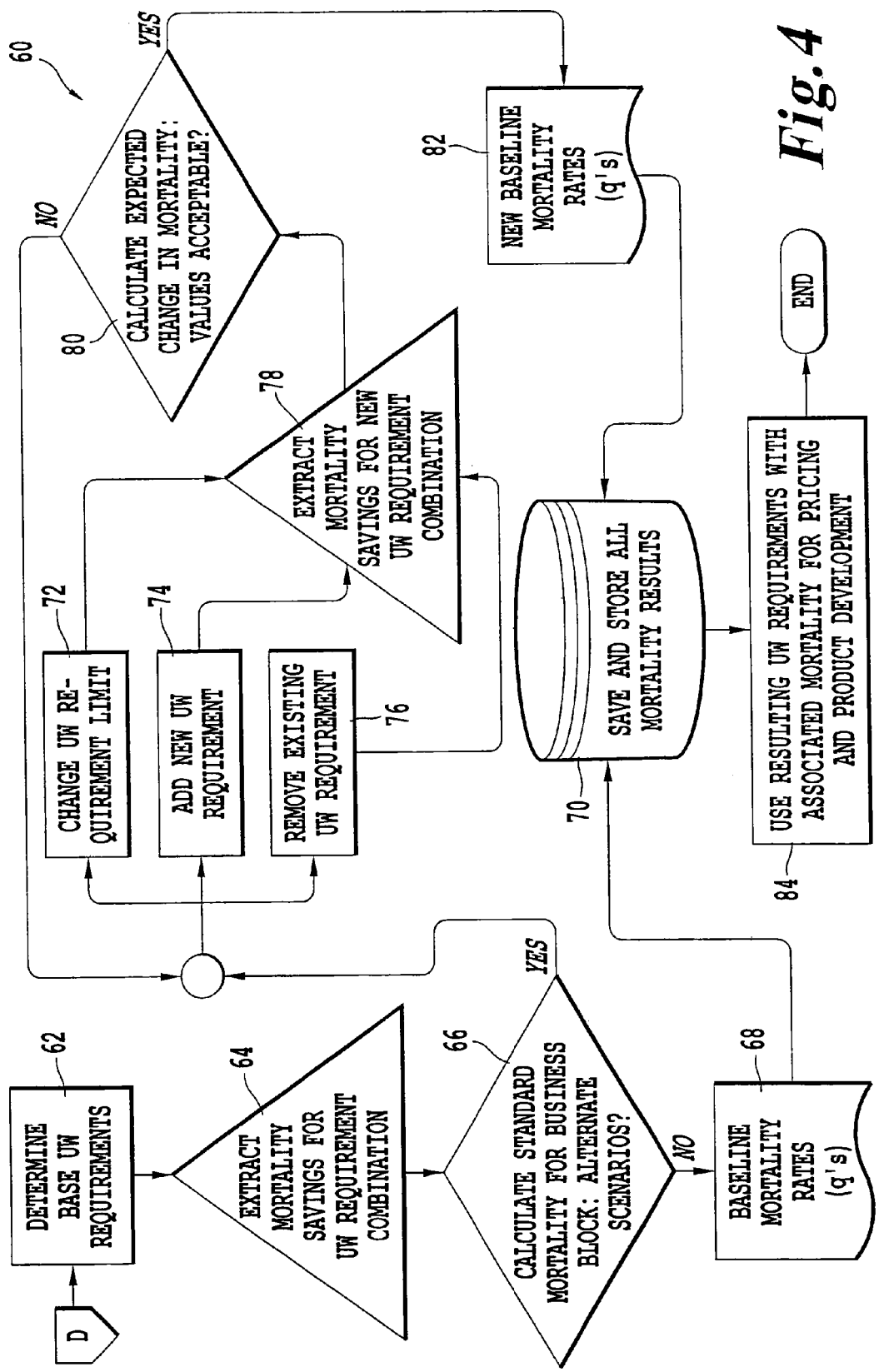
FIG. 4 is a continuation of the flow chart of FIG. 3.

Following the storage operation of step 58, the process proceeds as illustrated in connection with FIG. 4. FIG. 4 illustrates a portion 60 of a flow chart of an embodiment of a method and system for evaluating underwriting requirements. Step 62 of FIG. 4 represents a determination or selection of a "base" set of underwriting requirements. This set of underwriting requirements may be an existing set used by an insurer in connection with a particular product, or a new set to be evaluated for possible use with a future (or existing) product. In either event, step 64 is an operation in which the mortality savings previously stored in step 58 for the base underwriting requirement combination are extracted from storage. Using the mortality savings for the particular combination, standard mortality for a block of business is calculated in step 66. If the evaluation of alternative scenarios (i.e., alternative underwriting requirement combinations) is not required or desired, the base line mortality rates calculated in step 66 are outputted (step 68) and stored (step 70). If the evaluation of alternative scenarios is desired, the process continues as illustrated in FIG. 4. Specifically, changes exemplified by steps 72, 74 and 76 may be made. These include changing the limits used in connection with underwriting requirements in the combination (step 72), adding a new underwriting requirement to the combination (step 74), or removing one of the underwriting requirements from the combination (step 76). These steps may be practiced singly or in combination. After the desired change is made, mortality savings for the "new" set of underwriting requirements are extracted, as illustrated by step 78. Expected changes in mortality are then calculated, as indicated in step 80. If the results of the calculation are not acceptable (or if other alternatives are to be generated for comparison), the process returns as illustrated to steps 72, 74 and/or 76. The process may proceed iteratively until the result of the calculation of step 80 is acceptable. These results are outputted (step 82) and stored (step 70), as indicated in FIG. 4.

The results produced and stored in step 70 may be used as indicated in step 84 to evaluate or determine pricing in connection with new or existing insurance products, or for the design and development of a new insurance product.

FIG. 5 is a graphical representation of shared, unique and total mortality savings as determined from a protective value study for a plurality of underwriting requirements. As previously noted, the "unique value" represents the present value of mortality savings solely attributable to a particular underwriting requirement. The "shared" value represents the present value of mortality savings that considers the influence of all other requirements that contributed information toward the classification of the risk. Consideration of both shared and unique values identifies duplication which occurs between multiple requirements, and which requirements may represent "core" requirements having the greatest impact on mortality. The unique and shared values also demonstrate value associated with confirming and refining knowledge gained through multiple underwriting requirement sources.

One simplified example of an application of the illustrated method will now be described. Company XYZ is a provider of term life insurance. For simplicity, it will be assumed that the product offered by Company XYZ has only one non-tobacco preferred class and a residual standard class. Minimum policy size is $100,000 and all applicants are paramedically examined with complete blood and urine testing. Preferred criteria allow blood pressure up to 140/85, total cholesterol up to 205, cholesterol/hdl ratio of 5.0, and a BMI of 29.2. Company XYZ would like to know the incremental and total impact on expected mortality if blood tests are dropped, and if medical history questionnaires instead of full paramedical exams are used at certain ages. Age and amount guidelines for the current and proposed products are the same, and only one age and amount band is considered here for illustrative purposes.

Figure 6:
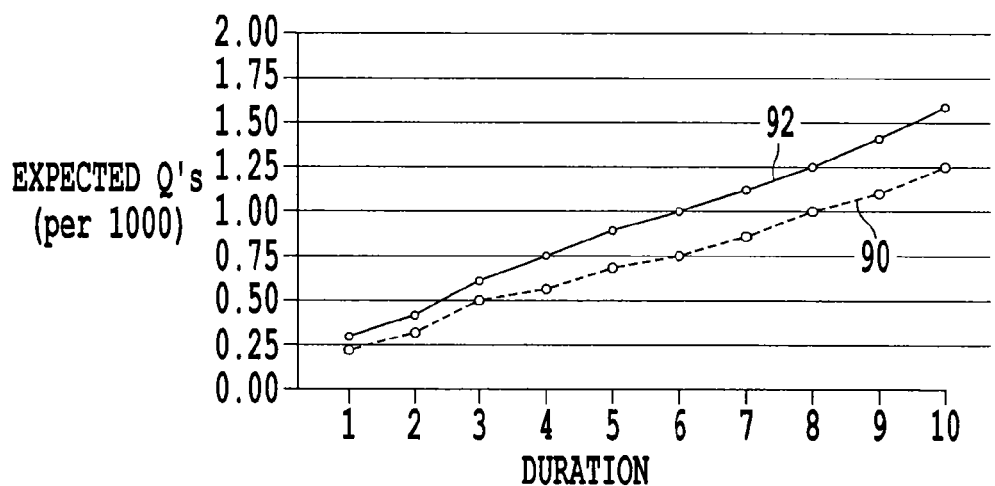
FIG. 6 is a graphical representation illustrating an illustrative example application of the system and method.

FIG. 6 illustrates the current baseline mortality for the preferred class (line 90 of FIG. 6). Line 92 of FIG. 6 illustrates expected mortality if blood tests are dropped. As indicated, mortality would increase 30% in durations 1-5, and 26% in durations 6-10. In this hypothetical example, 23% of applicants would be expected to qualify for the preferred non-tobacco class under current guidelines. If Company XYZ changes its definition of preferred by relying on urine tests rather than both blood and urine tests, and relies upon self reported cholesterol values, those qualifying for the preferred product would increase significantly to 53%, and more residual class risks would qualify for the preferred class. Accordingly, expected preferred mortality from the original baseline to the new baseline would be expected to increase by an average of 20% for this age and amount grouping.

Figure 7:
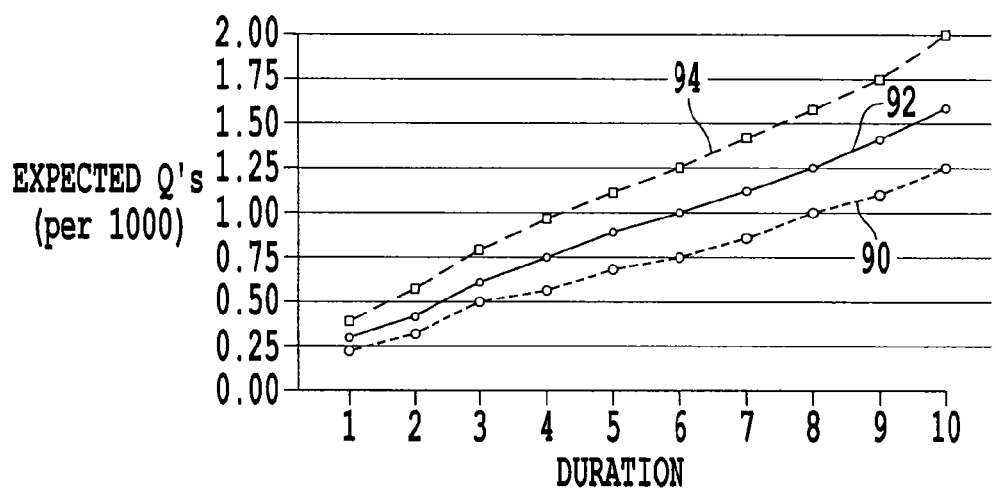
FIG. 7 is a graphical representation further illustrating an application of the system and method.

FIG. 7 further illustrates the cumulative effect on expected preferred mortality if a medical history questionnaire is used instead of a full paramedical exam, and if urine tests are substituted for blood and urine tests. The expected mortality in this case is illustrated by line 94. The cumulative effect is a mortality increase of 66% in durations 1-5 and 58% in durations 6-10. In addition to the changes generated by eliminating blood tests, switching to a non-medical questionnaire without benefit of a physical examination contributes additional increases in preferred mortality due to the inability to verify build (BMI) and blood pressure.

Reasons why Company XYZ might want to evaluate such changes include the costs associated with the subject requirements. For example, urine tests may be substantially easier and less expensive to obtain, when compared to blood tests. Similarly, use of a medical history questionnaire is likely to be easier and less expensive than a full paramedical examination. Evaluation of the expected impacts of such changes on mortality of the insured group will allow insurers such as Company XYZ to make economically rational decisions regarding such changes.

A further example will illustrate the manner in which causes of death and unique and shared mortality savings are determined. For simplicity, assume that an insurance product has only two underwriting requirements: blood tests and motor vehicle reports (MVR). Blood tests uncover (among other impairments) lipid abnormalities and liver abnormalities. MVR uncovers motor vehicle violations, including speeding tickets, DUIs (driving under the influence of alcohol), and others. For illustrative purposes, we will consider two opposite causes of death: ischemic heart disease (IHD) and motor vehicle accidents (MVA). Assume the following causes of death are eliminated by screening for the above impairments: screening for lipid abnormalities eliminates 50% of IHD deaths and 0% of MVA deaths; screening for liver abnormalities eliminates 0% of IHD deaths and 20% of MVA deaths (liver abnormalities indicate excessive drinking and drunk driving is attributable to a large proportion of motor vehicle deaths); screening for motor vehicle violations eliminates 0% of IHD deaths and 50% of MVA deaths. Finally, assume that 90% of the 20%, or 18% (0.9*20%), of the MVA deaths eliminated by elevated liver values would be uncovered by the MVR (ex: applicant had a DUI). Now assume the following cause of death distributions for different ages before underwriting:

| DEATHS PER 1,000,000 BEFORE UW REQ. | | | | |
| --- | --- | --- | --- | --- |
| COD | M25 | M45 | M65 | M85 |
| Ischemic HD | 10 | 100 | 500 | 7,000 |
| Motor Vehicle Accidents | 150 | 100 | 200 | 500 |
| TOTAL COD | 160 | 200 | 700 | 7,500 |

If only blood tests are required, the total mortality savings would be 50% of IHD deaths (from lipids) and 20% of MVA deaths (from liver). If only MVR is required, the total mortality savings would be 0% of IHD deaths and 50% of MVA deaths. If both blood tests and MVR are required, the total mortality savings would be 50% of IHD deaths and 52% (50%+20%−18%) of MVA deaths. This leads to the following grid:

| | Absolute Deaths Eliminated by UW Test | | | | % Decrease in Mortality | | | |
| --- | --- | --- | --- | --- | --- | --- | --- | --- |
| UW Test | M25 | M45 | M65 | M85 | M25 | M45 | M65 | M85 |
| No Test | 0 | 0 | 0 | 0 | 0% | 0% | 0% | 0% |
| Blood Profile | 35 | 70 | 290 | 3600 | −22% | −35% | −41% | −48% |
| MVR | 75 | 50 | 100 | 250 | −47% | −25% | −14% | −3% |
| Both | 83 | 102 | 354 | 3760 | −52% | −51% | −51% | −50% |

Reading the chart for a male age 45: 70 deaths are eliminated by collecting blood alone (70=50%*100+20%*100); 50 deaths are eliminated by collecting MVR alone (50=0*100+50%*100); and if both requirements are collected, the unique value for blood is 52 (50 from IHD, 2 from MVA), the unique value for the MVR is only 32 (50-18 deaths uncovered by both requirements), and the shared value is 18.

Consideration of both unique and shared values are important because, if blood tests are dropped for males age 45, a mortality savings of 70 will NOT be lost. Rather, a mortality savings of only 52 will be lost, since the shared mortality savings of 18 is uncovered by either blood tests or MVR.

It is further noted that, basing the model on the underlying causes of death naturally adjusts for the importance of different underwriting requirements by age. For example, at age 25, most of the mortality savings (in this simplified example) can be achieved simply by obtaining an MVR. However, at age 85, collecting blood is far more important than the MVR.

Although the system and method have been described with reference to particular embodiments, from the foregoing description, one skilled in the art can easily ascertain the essential characteristics of the system and method, and various changes and modifications may be made to adapt the various uses and characteristics without departing from the spirit and scope of the invention as set forth in the claims.

What is claimed is:

1. A computer method for evaluating expected changes in mortality of an insurable class in response to a change in underwriting requirements, the method being executed on computer hardware, comprising the steps of:
    storing data relating to protective values of a plurality of underwriting requirements on the computer hardware;
    calculating values of a shared mortality savings and a first and second unique mortality savings for a first set underwriting requirements including blood tests and motor vehicle reports based on the stored protective values with the computer hardware, the shared mortality savings being calculated based on a combination of both the blood tests and the motor vehicle reports, the first unique mortality saving being calculated by eliminating causes of death determined by the blood tests, the second unique mortality saving calculated by eliminating causes of death determined by the motor vehicle reports;

determining an expected mortality for the insurable class using the first set of underwriting requirements, by using the shared mortality savings and the first and the second unique mortality savings;

changing the first set of underwriting requirements to a changed set of underwriting requirements; and redetermining the expected mortality for the insurable class using the changed set of underwriting requirements to evaluate changes in expected mortality as a function of a change of the underwriting requirements.

2. The method of claim 1, wherein the step of calculating values further comprises the step of calculating a total mortality savings from the stored protective values for at least one of said underwriting requirements.

3. The method of claim 1, further comprising the step of storing mortality savings for said at least one of the plurality of underwriting requirements by age, gender and smoking status.

4. The method of claim 1, further comprising the step of storing data relating to prevalence of one or more impairments in a population.

5. The method of claim 1, further comprising the step of identifying one or more impairments uncovered by at least one of the plurality of underwriting requirements.

6. The method of claim 5, further comprising the step of determining one or more causes of death eliminated by screening for said one or more impairments uncovered by at least one of the plurality of underwriting requirements.

7. The method of claim 1, further comprising the step of determining total causes of death eliminated by at least one of said first set of underwriting requirements and said changed set of underwriting requirements.

8. The method of claim 7, further comprising the step of comparing expected causes of death for the insurable class with causes of death for a general population.

9. A computerized system for evaluating expected changes in mortality of an insurable class in response to a change in underwriting requirements, comprising:

means for storing data relating to protective values of a plurality of underwriting requirements;

means for calculating values of a shared mortality savings and a first and second unique mortality savings for a first set of underwriting requirements including blood tests and motor vehicle reports based on the stored protective values with the computer hardware, the shared mortality savings being calculated based on a combination of both the blood tests and the motor vehicle reports, the first unique mortality saving being calculated by eliminating causes of death determined by the blood tests, the second unique mortality saving calculated by eliminating causes of death determined by the motor vehicle reports;

means for determining an expected mortality for the insurable class using a first set of underwriting requirements, by using the shared mortality savings and the first and the second unique mortality savings;

means for changing the first set of underwriting requirements to a changed set of underwriting requirements; and means for redetermining the expected mortality for the insurable class using the changed set of underwriting requirements to evaluate changes in expected mortality as a function of a change of the underwriting requirements.

10. The system of claim 9, wherein said means for calculating values comprises means for calculating a total mortality savings from the stored protective values for at least one of said underwriting requirements.

11. The system of claim 9, further comprising means for storing mortality savings for said at least one of the plurality of underwriting requirements by age, gender and smoking status.

12. The system of claim 9, further comprising means for storing data relating to prevalence of one or more impairments in a population.

13. The system of claim 9, further comprising means for identifying one or more impairments uncovered by at least one of the plurality of underwriting requirements.

14. The system of claim 13, further comprising means for determining one or more causes of death eliminated by screening for said one or more impairments uncovered by at least one of the plurality of underwriting requirements.

15. The system of claim 9, further comprising means for determining total causes of death eliminated by at least one of said first set of underwriting requirements and said changed set of underwriting requirements.

16. The system of claim 15, further comprising means for comparing expected causes of death for the insurable class with causes of death for a general population.

17. A computer method of designing a life insurance product, the method being executed on computer hardware, comprising the steps of:

storing data relating to protective values of a plurality of underwriting requirements on the computer hardware;

calculating first and second unique mortality savings, shared mortality savings and total mortality savings for a first set of underwriting requirements with the computer hardware, the shared mortality savings being calculated based on a combination of both the blood tests and the motor vehicle reports, the first unique mortality saving being calculated by eliminating causes of death determined by the blood tests, the second unique mortality saving calculated by eliminating causes of death determined by the motor vehicle reports;

determining an expected mortality for an insurable class using the first set of underwriting requirements with the computer hardware, by using the shared mortality savings and the first and the second unique mortality savings;

changing the first set of underwriting requirements to a changed set of underwriting requirements;

redetermining the expected mortality for the insurable class using the changed set of underwriting requirements to evaluate changes in expected mortality as a function of a change of the underwriting requirements; and using the determined expected mortality and the redetermined expected mortality to design a life insurance product.

18. The method of claim 17, further comprising the step of repeating steps of changing and redetermining to consider a plurality of sets of underwriting requirements.

19. The method of claim 17, wherein the step of storing data relating to protective values of a plurality of underwriting requirements comprises the step of storing at least one of a unique protective value, a shared protective value and a total protective value for at least one of said underwriting requirements.

20. The method of claim 17, further comprising the step of storing mortality savings for said at least one of the plurality of underwriting requirements by age, gender and smoking status.

21. The method of claim 17, further comprising the step of storing data relating to prevalence of one or more impairments in a population.

22. The method of claim 17, further comprising the step of identifying one or more impairments uncovered by at least one of the plurality of underwriting requirements.

23. The method of claim 22, further comprising the step of determining one or more causes of death eliminated by screening for said one or more impairments uncovered by at least one of the plurality of underwriting requirements.

24. The method of claim 17, further comprising the step of determining total causes of death eliminated by at least one of said first set of underwriting requirements and said changed set of underwriting requirements.

25. The method of claim 24, further comprising the step of comparing expected causes of death for the insurable class with causes of death for a general population.

26. A computerized system for designing a life insurance product, comprising:
    means for storing data relating to protective values of a plurality of underwriting requirements;
    means for calculating a first and a second unique mortality savings, shared mortality savings and total mortality savings for said plurality of underwriting requirements, the shared mortality savings being calculated based on a combination of both the blood tests and the motor vehicle reports, the first unique mortality saving being calculated by eliminating causes of death determined by the blood tests, the second unique mortality saving calculated by eliminating causes of death determined by the motor vehicle reports;
    means for determining an expected mortality for an insurable class using the first set of underwriting requirements by using the shared mortality savings and the first and the second unique mortality savings;
    means for changing the first set of underwriting requirements to a changed set of underwriting requirements;
    means for redetermining the expected mortality for the insurable class using the changed set of underwriting requirements to evaluate changes in expected mortality as a function of a change of the underwriting requirements; and
    means for using the determined expected mortality and the redetermined expected mortality to design an insurance product.

27. The system of claim 26, wherein the means for storing data relating to protective values of a plurality of underwriting requirements comprises means for storing at least one of a unique protective value, a shared protective value and a total protective value for at least one of said underwriting requirements.

28. The system of claim 26, further comprising means for storing data relating to prevalence of one or more impairments in a population.

29. The system of claim 26, further comprising means for identifying one or more impairments uncovered by at least one of the plurality of underwriting requirements.

30. The system of claim 29, further comprising means for determining one or more causes of death eliminated by screening for said one or more impairments uncovered by at least one of the plurality of underwriting requirements.

31. The system of claim 26, further comprising means for determining total causes of death eliminated by at least one of said first set of underwriting requirements and said changed set of underwriting requirements.

32. The system of claim 31, further comprising means of comparing expected causes of death for the insurable class with causes of death for a general population.

33. The method of claim 1, wherein in said step of changing the first set of underwriting requirements, the blood tests are not taken into account for calculating the unique and shared mortality savings.

34. The computerized system of claim 9, wherein in the means for changing one or more of said first set of underwriting requirements, the blood tests are not taken into account.

35. The method of claim 17, wherein in said step of changing the first set of underwriting requirements, the blood tests are not taken into account for calculating the unique and shared mortality savings.

36. The computerized system of claim 26, wherein in the means for changing one or more of said first set of underwriting requirements, the blood tests are not taken into account.

* * * * *